Dec. 28, 1965 F. W. RECKNAGEL 3,226,168
COMPOSITE SEAL CONSTRUCTION FOR ANTIFRICTION BEARINGS
Filed Jan. 18, 1963
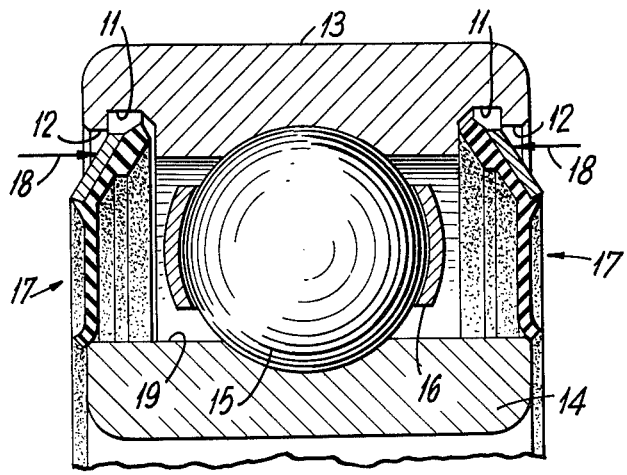
FIG. 3
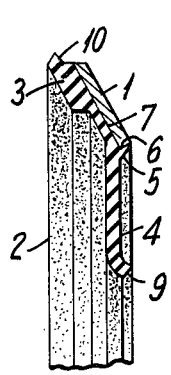
FIG. 1
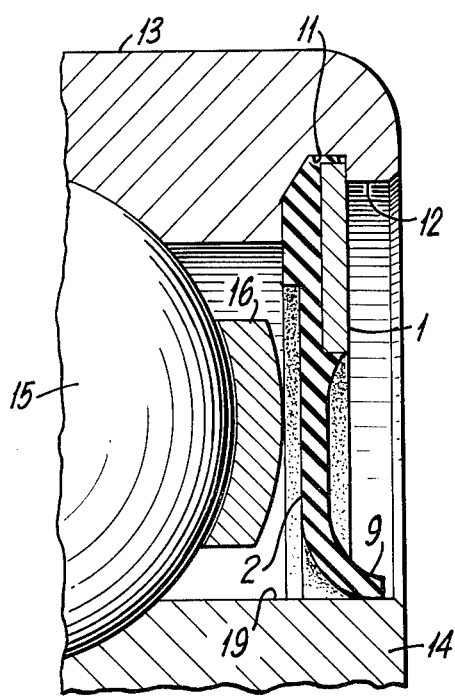
FIG. 4
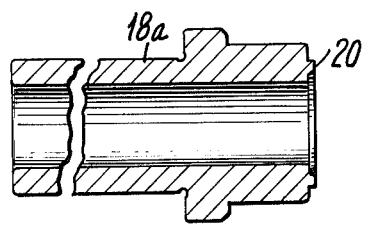
FIG. 2
INVENTOR.
FREDERICK W. RECKNAGEL
BY 
ATTORNEY.

3,226,168
COMPOSITE SEAL CONSTRUCTION FOR
ANTIFRICTION BEARINGS
Frederick W. Recknagel, Verbank, N.Y., assignor to The
Federal Bearings Co., Inc., Poughkeepsie, N.Y., a corporation of New York
Filed Jan. 18, 1963, Ser. No. 252,470
2 Claims. (Cl. 308—187.1)

This invention relates to a composite antifriction bearing seal for closing the space between a pair of relatively rotatable antifriction bearing members against the intrusion of dirt, moisture, corrosive fluids, and the like, while assuring flexibility of operation of the seal and while retaining the lubricant within the bearing in situations where eccentricity or lack of running truth might occur between the inner and outer components of a bearing.

Many seals employed in antifriction bearings involve the use of relatively rigid members which, depending on their design, tend to have a braking or dampening effect upon the relative movement of the bearing components. One example of such a seal is a stiff molded plastic annular sealing disc, e.g. of nylon, held snugly in position against rotating surfaces by a steel retaining ring or washer. The snugly fitting nylon seal is first snapped into position in the peripheral groove of one of the annular bearing members and the metal washer in the pre-cupped form slipped into position next to the seal and then locked into place by flattening out with a tool inserted between the bearing members. The size of the washer must be sufficiently precise so that it will lock itself concentrically by expansion when it is flattened in binding relationship with the seal member. Because of the stiffness of the plastic seal and the necessity of maintaining it in positive sealing engagement with the moving bearing surface, sufficient resistance to bearing rotation generally resulted accompanied by a rise in frictional heat.

Substituting a resilient pliable rubber seal in place of the stiff plastic seal presented a seal-mounting problem in that it was difficult to consistently make the two separate sealing elements, i.e. the seal and the retaining ring or washer, combine into a uniform assembly without the rubber seal in some instances becoming loose and falling out from between the bearing members.

It is known to use a rubber seal member bonded to a metal retaining member with the rubber extending beyond the O.D. of the steel retaining ring in the form of a bead or portion having a larger cross sectional thickness than the seal portion terminating radially inwardly therefrom. By necessity, the outside diameter of the steel retaining ring is made less than the entrance diameter of the seal groove, while the diameter across the bead of the seal is made greater than the seal groove entrance diameter. This usually results in the bead compressing and returning to somewhat less than its initial size and shape after seal installation. While the bead on the seal is relied upon to keep the seal in the bearing, this method of seal retention is not always reliable. Because of manufacturing tolerances, when the diameter across the seal bead is on the minus side and the tolerance of the groove diameter of the bearing with which the seal is used is on the plus side, the resultant seal assembly may be such that the seal becomes loose and comes out of the bearing.

In one attempt to overcome the foregoing problem, the enlarged bead portion of the rubber seal was eliminated and the diameter of the steel retaining member or washer increased and bent over peripherally to form a flange with a diameter small enough to enable it to snap fit into the seal groove of the bearing member and locked in place by expanding the diameter of the retaining ring by compressing the bent flange with a suitable tool. However, this method had its disadvantages in that due to the heavy pressure required to fold the flange down to lock the seal in place, the rubber portion of the seal would tend to cut through where it made contact with the peripheral groove of the outer bearing. To overcome the cutting problem, it was necessary to reduce the diameter of the rubber portion of the seal so that it did not contact the outer bearing, thus resulting in reducing the effectiveness of the seal.

In another attempt to overcome the problem, a composite seal was proposed comprising a rubber seal bonded to a flat split washer, the composite seal being spring fitted into the annular seal groove of the outer bearing by compressing the split washer while inserting it in the groove and then allowing it to spring back to fit the groove. However, this seal had its disadvantages in that the rubber seal at the split portion of the washer tended to crimp and distort due to the tendency of the split washer to contract and expand.

I have now developed a novel composite metal and resilient seal which overcomes the foregoing difficulties and makes possible the accurate positioning of the seal in the bearing with minimum assembly time.

As a feature of my invention, I provide a composite seal in which the metal retaining ring or washer is pre-cupped or has a convex configuration and is bonded on its concave side to a resilient seal of elastomeric material having a radial end portion which is similarly configurated so as to mate with the concave side of the metal retaining ring.

As another feature, the resilient seal used in the composite structure is slightly larger in diameter than the convexed retaining ring, thereby reducing considerably the possibility of having loose seals because of oversize seal grooves. Because of the small amount of pressure needed to flatten out the pre-cupped and molded rubber seal, the possibility of damaging the seal during assembly in the bearing is greatly reduced.

It is thus an object of my invention to provide an improved bearing seal which is easily assembled to form a fairly rigid mounting within a bearing and yet which flexibly accommodates itself to actual working conditions of a bearing and maintains its seal at both the inner and outer bearing races.

Another object is to provide a lubricant seal that will retain oil and grease at the moving parts and keep dust and dirt therefrom.

A still further object is to provide an antifriction bearing having a novel lubricant seal therein.

These and other features and objects will clearly appear from the disclosure when taken in conjunction with the accompanying drawings, wherein:

FIG. 1 depicts in partial section a composite seal of convex shape employed in carrying out the invention;

FIG. 2 is illustrative of a cross section of a cylindrical flattening tool employed in flattening the composite seal after insertion into the side of the bearing;

FIG. 3 is illustrative of the mounting of the composite seal between the outer and inner annular bearing members of antifriction bearing prior to flattening into position; and FIG. 4 shows the composite seal when substantially firmly mounted within the bearing after flattening out of the pre-cupped metal retaining ring.

Stating it broadly, my improved composite bearing seal comprises a somewhat rigidized radial end mounting portion and a freely extending wiping portion at its opposite radial end portion terminating into a circular lip wherein the rigidized radial end portion is adapted to be received within the annular seal groove of one of the bearing members. The composite seal is made up of a pre-cupped or convex metal retaining ring bonded to a seal of resilient elastomeric material, e.g. synthetic or natural rubber, in conforming relationship to the convex shape of the retaining ring, the bonding being on the concave side of the pre-cupped metal retaining ring.

Referring to FIG. 1, I show a preferred embodiment of the composite seal of the invention, the elements comprising pre-cupped or convex shaped metal retaining ring 1, cupped to an angle of about 30° C. and a seal 2 of Buna N rubber having a thickened portion 3 at one radial end portion and a wafer-thin freely extending portion 4 at the opposite radial end portion. The seal preferably, though not necessarily, has a projecting annular shoulder 5 against which the inner periphery 6 of retaining ring 1 bears. Its concave side 7 is bonded to the face of seal 2, the free end 4 of the opposite radial end of the seal preferably terminating into a slightly curved circular lip 9. The curved lip is not essential to the structure, since the free end of the resilient elastic seal will assume that configuration when it is stretched over the land of the other bearing race ring or member.

The composite seal is preferably produced by hot molding. The pre-cupped metal ring is placed in a mold cavity and a slug of uncured synthetic rubber placed thereon. A mating half mold is then brought down in contact with the materials and heat and pressure applied. Upon completion of curing, the mold halves are separated, the composite seal removed and the excess rubber as flash trimmed away.

The thickened portion of the seal protrudes beyond the outer periphery of the retaining ring in the form of a circular bead or prejection 10 as shown in FIG. 1, the diameter of which is slightly larger than the diameter of the seal groove 11 shown in FIG. 3. The outside diameter of the pre-cupped metal retaining ring should be no larger than the diameter of the radial ledge 12 adjacent the seal groove so that the metal ring may clear the ledge as the composite seal is inserted into the annular seal groove as shown in FIG. 3.

In FIG. 3 a partial cross section of a bearing is shown comprising outer annular bearing member 13 and inner annular bearing member 14 having therebetween a complement of balls 15 within a ball bearing cage 16.

A pair of composite seals 17 as pre-cupped is shown one at each side of the bearing opening positioned for final assembly the concave faces disposed inwardly of the annular chamber. By applying pressure circumferentially around the exposed metal ring as shown by heavy arrows 18, the pre-cupped composite seals are caused to flatten out and assume firmly the fixed vertical position shown in the enlarged drawing of FIG. 4. A flattening tool for this purpose is depicted in FIG. 2 which shows a cylindrical tool 18a without its mounting (and not scaled to FIG. 3) having raised annular portion 20 for contacting the complete face of the retaining ring. The circular bead of the seal material extending beyond the rim of the metal ring is caused together with the thickened portion of the seal to be compressed within seal-retaining groove 11, with a portion of the bead preferably filling in at least a portion of the space between the roof of the groove and the rim of the metal retaining ring as shown in FIG. 4 and with circular lip 9 flexed in wiping engagement with land 19 of inner race 14. Thus, the seal is firmly anchored in place under conditions which allow the seal to ride out any eccentricity which may exist in the bearing without any sacrifice in its sealing quality.

By using a seal material having elastomeric properties, I find that my composite seal is very effective in safeguarding the bearing lubricant without substantially impeding bearing rotation. The elastomeric material I prefer to use in carrying out my invention is Buna N rubber. Synthetic or natural rubber may be employed. For example, neoprene rubber may be employed. Examples of other elastomeric materials include a chlorosulfonated polyethylene sold under the trademark Hypalon, certain of the chlorinated rubbers, styrene-butadiene copolymers known by the designation GR–S, butyl rubbers (isobutylene-isoprene), etc.

While the drawings show the outer bearing member to be peripherally grooved, it will be appreciated that the mounting means may be reversed. For example, the inner bearing may be grooved to receive the composite seal. In this instance, the metal ring would be concentrically bonded to the central portion of the annular seal around the opening while the outer periphery of the resilient seal would contact the land of the outer bearing member.

While the present invention has been described in conjunction with preferred embodiments, it is to be understood that modifications and variations may be resorted to without departing from the spirit and scope of the invention, as those skilled in the art will readiy understand. Such modifications and variations are considered to be within the purview and scope of the invention and the appended claims.

What is claimed is:

1. An annular composite lubricant seal having a rigidized radial end mounting portion and a freely extending wiping portion at its opposite radial end portion for closing the end of an annular chamber of a bearing comprising a continuous pre-cupped metal washer with complementary convex and concave faces, an annular sealing disc of resilient elastomeric material concentrically bonded at its inner annular face to the concave side of said metal washer, the sealing disc having a configuration at its bonding face conforming to that of the pre-cupped metal washer and a stepped thickened outer radial portion at its outer face, the wiping end portion of the sealing disc extending freely from the bonded portion and terminating into a circular lip, the thickness of the outer radial portion of the bonded portion of the sealing disc being greater than the thickness of the remaining bonded portion of the sealing disc and of the freely extending wiping end portion, the periphery of the thickened portion of the sealing disc extending slightly radially beyond the periphery of the bonded metal portion and terminating into a circular bead.

2. An antifriction bearing comprising an inner annular race ring concentrically located within an outer annular race ring which define an annular chamber therebetween containing a complement of rolling elements, one of said race rings having a peripheral groove spaced on each side of said rolling elements, the other of said race rings having a land opposite each of said peripheral grooves, and a seal mounted on each side of said rolling elements comprising a continuous metal washer to the inner side of which is concentrically bonded a radial portion of an annular sealing disc of resilient elastomeric material, said disc having a stepped thickened outer radial portion at said bonded radial portion which terminates into a circular bead slightly beyond the periphery of the washer, the radial portion of the disc opposite the bonded radial portion being thinner than the stepped thickened portion and extending radially inward of said bonded portion and terminating into a circular lip, said metal washer with its bonded annular disc being flexed flat so that its peripheral edge fits firmly into the peripheral groove with the circular bead of the elastomeric disc deformed into the bottom of the groove so as to cushion the peripheral edge of said washer, the freely extending portion of the sealing disc being in flexing engagement with the land of the opposite race ring.

References Cited by the Examiner

UNITED STATES PATENTS

| | | | |
|---|---|---|---|
| 1,762,819 | 6/1930 | Hughes | 308—187.2 |
| 1,888,361 | 11/1932 | Robinson | 308—186 |
| 2,276,225 | 3/1942 | Carter | 308—187.2 X |
| 2,467,049 | 4/1949 | Peterson | 277—94 |
| 2,850,792 | 9/1958 | Cobb | 308—187.2 X |
| 2,878,084 | 3/1959 | Bermingham | 308—189.1 |
| 2,886,347 | 5/1959 | Kupchick | 277—95 X |
| 3,003,835 | 10/1961 | Schindel | 277—94 X |

FOREIGN PATENTS

| | | |
|---|---|---|
| 386,157 | 6/1908 | France. |
| 581,232 | 10/1946 | Great Britain. |

DAVID J. WILLIAMOWSKY, *Primary Examiner.*

ROBERT C. RIORDON, DON A. WAITE, *Examiners.*

F. C. HAND, F. SUSKO, *Assistant Examiners.*